MAJORITY DATA SELECTING AND FAULT INDICATING

Filed Sept. 10, 1968

INVENTORS
JOHN E. GAMES
HENRY BARTMAN
BY Melvin Pearson Williams
ATTORNEY

United States Patent Office 3,538,498
Patented Nov. 3, 1970

3,538,498

MAJORITY DATA SELECTING AND FAULT INDICATING

John E. Games, Granby, and Henry Bartman, East Hartford, Conn., assignors to United Aircraft Corporation, East Hartford, Conn., a corporation of Delaware Filed Sept. 10, 1968, Ser. No. 758,878
Int. Cl. H04l *1/06;* G08c *25/00;* H04b *3/46*
U.S. Cl. 340—146.1 3 Claims

ABSTRACT OF THE DISCLOSURE

A triple redundant data bus is majority tested for at least two out of three signals in agreement. In addition, a fault is indicated if less than three of the signals agree, For signals based on analog information the digital data is converted to PWM before majority testing, and means are provided to ignore the small amount of error within the resolution of the system.

BACKGROUND OF THE INVENTION

Field of invention

This invention relates to data handling, and more particularly to redundant data recognition and fault detection circuitry.

Description of the prior art

It is well known in the data handling art that many forms of signals may be multiplexed so as to be handled over a single carrier system, such as a single bus of data carrying wires, or information carrying wireless transmission channels. In the prior art, redundant code systems have been utilized to verify the accuracy of data words. Additionally, redundant parity bits have been utilized to verify the accuracy of words. In some cases, word correction can be accomplished provided a sufficient amount of redundancy is utilized. However, this is limited to single-bit error correction, or even-bit error correction when certain assumptions are made with respect to the even number of errors which have occurred. Such systems are adequate where information handling is being done in a noncritical environment, such as in account or payroll data processing. However, in an on-line data handling system which handles data to control the operation of dangerous processes, machines, or vehicles (such as an aircraft), then there is a need to definitely have the information available (not merely know that there is an error) as well as detecting the occurrance of errors. In other words, it is not enough to ring a bell and indicate a fault; an aircraft about to land must be able to transmit data about the craft in the process of controlling the landing operation, with or without faults.

Additionally, data handling, testing and correction systems known to the prior art do not accommodate digitized manifestations of analog information wherein the degree of resolution of the analog information is not as great as the error detecting capability of the given system. For instance, if a given group of binary bits is indicative of a single analog value, and the analog value can be generated plus or minus a digital bit, then errors can result from channel bit granularity in redundant data handling systems where the different channels bearing the information could be digitized slightly differently (due to the granularity of the system). Therefore, it is difficult, if not impossible, to guarantee the derivation of information from redundant digitized analog signals to the degree required where aircraft control or other dangerous operations are involved.

SUMMARY OF INVENTION

The object of the present invention is to provide means for absolutely determining data content in a redundant data handling system, and to indicate faults therein.

In accordance with the present invention, bilevel representations which can comprise serial binary data or pulsewidth-modulated data are transmitted in a redundant system; that is, plural channels of the same information are utilized; the plural channels are compared to determine if a majority of them agree; if a majority agree, then the condition of the majority is taken as a manifestation of the correct data content of the plural channels at the time of sampling. In further accord with the present invention, means are provided to sense when less than all channels agree, to indicate a fault. Thus, not only is the data actually extracted from the lines in a significantly reliable fashion, but the occurrence of less than complete agreement among the channels is also manifested.

In accordance still further with the present invention, binary digital signals representative of analog information, which has been converted to digital form up-stream of the transmission channels, is converted to pulsewidth modulation prior to being analyzed for data content and faulty transmission, in order to accommodate the granularity of the analog to digital conversion process, whereby disagreements in the data content of the channels which are within the permissible error of the analog to digital conversion system will not prevent extracting data from the channels, even though the nature of error is such that erroneous information would be presented by recognizing the majority of digital pulses on the channels; additionally, a momentary lack of agreement between channels, resulting from the bit granularity, or resolution of the analog to digital conversion circuitry, is ignored.

The foregoing and other objects, features and advantages of the present invention will become more apparent in the light of the following detailed description of preferred embodiments thereof, as illustrated in the accompanying drawing.

DESCRIPTION OF THE PREFERRED EMBODIMENT

Figure 1:
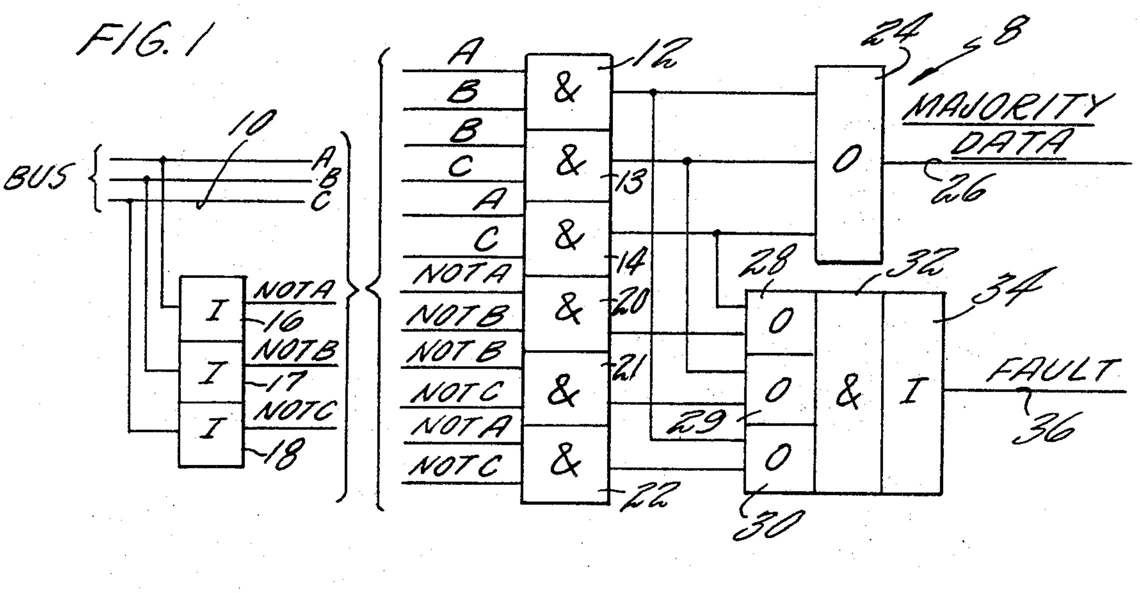
FIG. 1 is a schematic block diagram of data extracting and fault indicating circuitry in accordance with the present invention.

A majority data detector and fault indicator 8 according to the present invention is shown in FIG. 1, wherein a bus 10 of three data channels or lines is applied in combination (A, B, C) to three AND circuits 12–14, as well as to three inverters 16–18. The outputs of the inverters 16–18 comprises the complements (NOT A, NOT B, NOT C) of the signals on the bus 10. These signals are applied in combination to a plurality of AND circuits 20–22. The net effect of the AND circuits 12–14 is to sense true-signal agreement between any two out of the three lines in the bus 10. The outputs of the AND circuits 12–14 are passed through an OR circuit 24, the output of which comprises the data level as indicated by the majority of the three lines in the bus 10. Thus, if lines A and B are both energized, the AND circuit 12 will operate; if lines B and C both have a signal thereon, the AND circuit 13 will be energized; and if signals appear on both lines A and C, then the AND circuit 14 will have both inputs present. An output from any one of these AND circuits will cause the OR circuit 24 to generate the majority data level on a line 26. On the other hand, if two out of the three lines on the bus 10 have no signal thereon, then no one of the AND circuits 12–14 will have an output therefrom, and the OR circuit 24 will have no output, so that the majority data level on the line 26 will be the lack of a signal. Thus, if two out of the three lines on the bus 10 have affirmative signals thereon, then the OR circuit 24 will provide an affirmative signal on the majority data line 26; and if two out of the three have no signals thereon, then the majority data line 26 will have no signal thereon.

The AND circuits 20–22 sense the case of agreement at the low or non-affirmative level between two out of the three lines on the bus 10.

Three OR circuits 28–30 sense the case where all three lines agree. Thus, if AND circuits 12, 13 and 14 all operate, then they will drive OR circuits 28, 29 and 30 to operate an AND circuit 32 which, because of an inverter 34, will not produce a signal on a fault line 36. Similarly, if all three of the AND circuits 20–22 operate, then the OR circuits 28–30 will cause the AND circuit 32 to operate so that the inverter 34 will not produce a signal on the fault line 36. On the other hand, if only two out of the three lines agree, then neither all three AND circuits 12–14 nor all three AND circuits 20–22 will operate all of the three OR circuits 28–30, so that the AND circuit 32 will not operate and the inverter 34 will generate a fault signal on the line 36. The case of, for instance, AND circuits 12 and 13 operating concomitantly with AND circuit 22 operating could only occur if one of the inverters 16–18 failed, or if there was a failure among the AND circuits thermselves. This can be accommodated by periodically checking the circuitry by purposely placing false data on the bus 10, in accordance with techniques which are known in the art.

The circuitry of FIG. 1, therefore, will compare levels on the three lines in the bus 10, supply a data level indicative of the data level on two of the three lines (or all three of the lines) which agree, and will detect the case where less than three agree (meaning that one of the lines has a fault on it).

Assume that an analog to digital converter is accurate only to the least significant bit of digital information. That means that correct data could be expressed as a digital word of a first value, and a digital word of a value one bit higher or one bit lower would also have to be recognized as correct data (since it is within the resolution of the analog to digital conversion system). What could occur is that channel A reflects the correct data (for instance 1000), channel B indicates data one bit lower (0111), and if channel C failed and presented all zero's, then the majority detecting circuitry would detect 0000, which of course is an error since the correct information has to be expressed as either 1000, 0111, or 1001. Thus, majority voting on a digital bit-by-bit basis cannot be utilized for digitized analog information unless the resolution of the analog to digital converter is well within the least significant digital bit. As is known, this is not possible.

Figure 2:
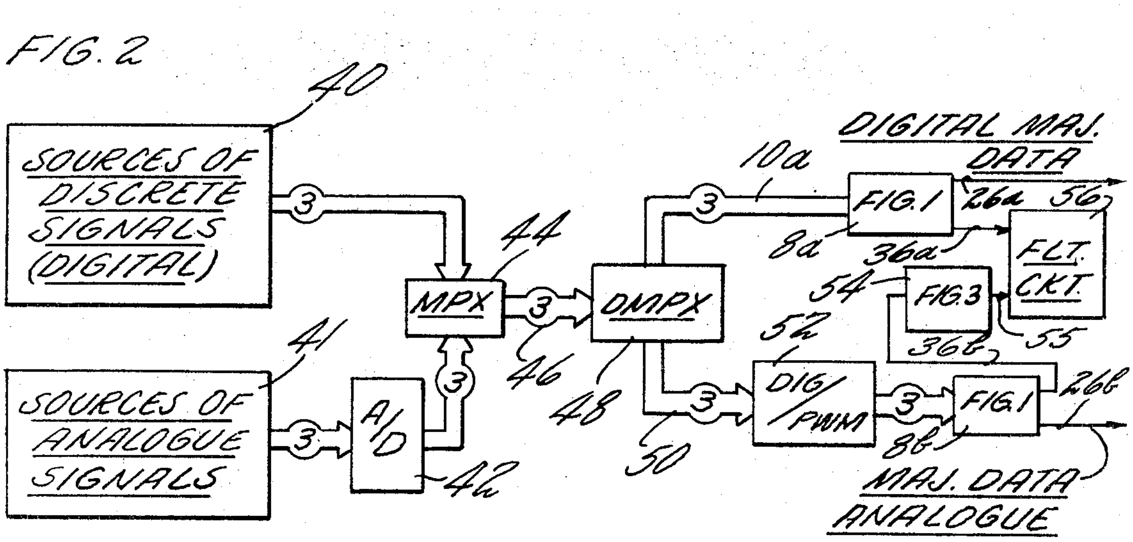
FIG. 2 is a schematic block diagram of a system incorporating the embodiments of FIGS. 1 and 3 of the present invention.

To overcome the foregoing problem, the present invention converts the digital expression of analog information to a pulsewidth-modulated expression of analog information before utilizing the circuitry of FIG. 1 to detect the data content of the bus of three lines, and to test for faults. As illustrated in FIG. 2, a data system incorporating the present invention may include sources 40 of discrete signals which appear in digital form as well as sources 41 of analog signals which are in amplitude modulated form. The analog signals may be passed through respective analog to digital converters 42, and both sets of signals applied to a set of multiplexers 44, for transmission over a data transmission bus 46. The bus 46 may terminate in a plurality of de-multiplexers 48, which separate the signals and therefore can transmit signals from the digital sources 40 over a bus 10*a* of three lines to a first data detector and fault indicator 8*a*, and can transmit signals from the analog sources 41 over another bus 50 of three lines to a digital-to-pulsewidth-modulation converter 52. The circuitry 40–48 will be proided in a triplicate fashion so that once information from a transducer or a digital source is suitably amplified and signal conditioned for transmission through the system, it is fanned out into three sets of identical circuitry and transmission lines so as to provide the redundance necessary to the present invention. Thus, the data bus 46 containing three lines is fed by three channels of multiplexer 44 and in turn feeds three channels of demultiplexer 48, the output of which comprises the three lines on the bus 10*a* or the bus 50.

The digital-to-pulsewidth-modulation converter 50 may comprise a well-known combination of a preset counter which accumulates digital pulses until it overflows, the overflow resetting a flip flop, the ON-time of which is a pulsewidth modulation manifestation of the digital count applied to the counter. This is well known in the art, and will not be described further herein. The output of the pulsewidth modulation converter 52 will supply another data detector and fault indicator 8*b*, of the kind described with respect to FIG. 1 hereinbefore. As described hereinbefore with respect to analog information, however, the actual pulsewidth modulation signal on each of the three lines of the bus 10*b* can vary by an increment equal to one digital bit without there being a true fault, due to the lack of resolution of the analog to digital conversion circuits 42. Thus, fault may be indicated where no fault exists, and an erroneous manifestation of majority data may appear on the three lines due to the lack of resolution of the A/D converters 42. By converting to pulsewidth modulation, if the three lines have on them, respectively; the accurate data, one digital value above the accurate data and one digital value below the accurate data; then the majority sensor will in fact indicate the accurate data and therefore removes the discrepancy between the tnree lines and provides accurate data out of the data detecting and fault indicating circuit 8*b*.

Figure 3:
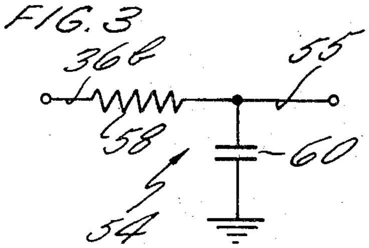
FIG. 3 is a schematic diagram of an analog bit granularity fault discriminator in accordance with the present invention.

In addition, the discrepancy between the three lines in the bus 10*b* as a result of lack of resolution of the A/D converter 42 should not indicate a channel fault if the three lines each represent data which is within the resolution of the A/D converter 42. In order to accommodate this, the conditional fault output of the circuit 8*b* is integrated so that the first sampled indications of fault are absorbed, and a fault will be recognized only if the fault sustains itself for more than a period of time equivalent to a couple of digital data bits. This is accomplished by a fault resolution discriminator 54, the details of which are shown in FIG. 3 and described hereinafter. The output 55 of the fault resolution discriminator 54 and the fault output 36*a* of the data selector and fault indicator 8*a* may be applied to suitable fault handling circuitry 56, in any fashion known to the prior art, to suit any implementation of the present invention in accordance with design criteria of an overall system in which invention is incorporated.

The fault resolution discriminator 54, shown in detail in FIG. 3, comprises an integrating circuit of a well known variety including a series resistor 58 and a shunt capacitor 60. The capacitor 60 must be charged before signals applied to the resistor 58 will appear on the output line 55 thereof. Since all three of the channels from the digital-to-pulsewidth-modulation converter 52 will have a signal starting at the same time and ending at slightly different times (the difference in time being equivalent to the one digital data bit of resolution by which these signals are allowed to disagree), the fault indication will occur at the nominal end of the pulsewidth modulated signals, but this fault indication will be absorbed by the resolution detector 54 for a sufficient length of time so that the fault indications will disappear (all three signals being zero by this time) by the time the capacitor 60 can be suitably charged to pass a signal through the line 55. Thus, not only does the circuitry of FIG. 1 in combination with the digital-to-pulsewidth-modulation converter 52 correctly sense majority data related to analog signals, it tends to correct the data, and the incorporation of the circuit 54 negates the sensing of fault when the disagreement between the lines relates only to the permissible variation in the output of the A/D circuits 42. These are important aspects of the present invention.

The embodiments disclosed herein are described with respect to a two-out-of-three system. However, more redundancy (three-out-of-five, or four-out-of-seven, etc.) may be used for even greater assurance of valid data, and to allow more faults to occur without diluting the quality of the data. For instance, an aircraft could dispatch or takeoff with one fault and still be able to tolerate at least one more fault before it would fail to operate in response to valid data.

Although the invention has been shown and described with respect to preferred embodiments thereof, it should be understood by those skilled in the art that various changes and omissions in the form and detail thereof may be made therein without departing from the spirit and the scope of the invention.

Having thus described a typical embodiment of our invention, that which we claim as new and desired to secure by Letters Patent of the United States is:

1. In a redundant data handling system employing a plurality of digital data channels for the transmission of plural signal levels comprising digital data manifestations of analog information wherein the resolution of analog data is less than the resolution of the digital manifestations thereof, data detecting apparatus comprising:

a plurality of channel means, each presenting digital manifestations of the same analog information;

a plurality of converter means, one for each of said channel means, each converter means converting the manifestations of the related one of said channel means from digital to pulsewidth modulation manifestations, each of said converter means having an output channel for transmitting related pulsewidth manifestations;

sensing means responsive to all of said converter output channels for detecting a common data signal level on a majority of said output channels;

and means responsive to said sensing means for generating a data signal level indicative of said common signal level.

2. Apparatus according to claim 1 additionally comprising:

fault means responsive to the absence of a common signal level on all of said output channels for generating a conditional channel fault manifesting signal;

and means responsive to said fault means for generating a channel fault signal in response to conditional channel fault signal generation by said fault means for a period of time in excess of a predetermined period.

3. In a redundant data handling system employing a plurality of digital data channels for the transmission of plural signal levels comprising digital data manifestations of analog information wherein the resolution of analog data is less than the resolution of the digital manifestations thereof, data detecting apparatus comprising:

a plurality of channel means, each presenting digital manifestations of the same analog information;

a plurality of converter means, one for each of said channel means, each converter means converting the manifestations of the related one of said channel means from digital to pulse-width modulation manifestations, each of said converter means having an output channel for transmitting related pulsewidth manifestations;

fault means responsive to the absence of a common signal level on all of said output channels for generating a conditional channel fault manifesting signal;

and means responsive to said fault means for generating a channel fault signal in response to conditional channel fault signal generation by said fault means for a period of time in excess of a predetermined period.

References Cited

UNITED STATES PATENTS

| | | | |
|---|---|---|---|
| 2,628,346 | 2/1953 | Burkhart | 235—153 X |
| 3,219,838 | 11/1965 | Hurst | 328—111 |
| 3,226,569 | 12/1965 | James | 307—204 |

MALCOLM A. MORRISON, Primary Examiner

R. S. DILDINE, Jr., Assistant Examiner

U.S. Cl. X.R.

307—211, 219; 328—104